(12) United States Patent
Liu et al.

(10) Patent No.: US 11,196,035 B2
(45) Date of Patent: Dec. 7, 2021

(54) ANODE OF LITHIUM BATTERY, METHOD FOR FABRICATING THE SAME, AND LITHIUM BATTERY USING THE SAME

(71) Applicants: Tsinghua University, Beijing (CN); HON HAI PRECISION INDUSTRY CO., LTD., New Taipei (TW)

(72) Inventors: Yuan-Feng Liu, Beijing (CN); Ze-Cheng Hou, Beijing (CN); Lu Chen, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/276,922

(22) Filed: Feb. 15, 2019

(65) Prior Publication Data

US 2020/0106085 A1  Apr. 2, 2020

(30) Foreign Application Priority Data

Sep. 29, 2018  (CN) .......................... 201811146948.2

(51) Int. Cl.
*H01M 4/131* (2010.01)
*H01M 10/0525* (2010.01)
*H01M 4/485* (2010.01)
*H01M 4/1391* (2010.01)

(52) U.S. Cl.
CPC ......... *H01M 4/131* (2013.01); *H01M 4/1391* (2013.01); *H01M 4/485* (2013.01); *H01M 10/0525* (2013.01)

(58) Field of Classification Search
CPC ............... H01M 4/131; H01M 4/1391; H01M 10/0525; H01M 4/485
See application file for complete search history.

(56) References Cited

U.S. PATENT DOCUMENTS

2010/0330425 A1  12/2010  Lopatin et al.
2016/0197352 A1   7/2016  Blaser et al.

FOREIGN PATENT DOCUMENTS

| CN | 102013470 | 4/2011 |
|---|---|---|
| CN | 102690968 | 9/2012 |
| CN | 103578784 | 2/2014 |
| CN | 105762327 | 7/2016 |
| CN | 106229462 | 12/2016 |

(Continued)

OTHER PUBLICATIONS

Qi, Z., Zhao, C., Wang, X., Lin, J., Shao, W., Zhang, Z., & Bian, X. (2009). Formation and Characterization of Monolithic Nanoporous Copper by Chemical Dealloying of Al—Cu Alloys. The Journal of Physical Chemistry C(113), 6694-6698. (Year: 2009).*

(Continued)

*Primary Examiner* — Milton I Cano
*Assistant Examiner* — Jenna Shulman
(74) *Attorney, Agent, or Firm* — ScienBiziP, P.C.

(57) ABSTRACT

An anode of the lithium ion battery is provided. The anode of the lithium ion battery comprises a nanoporous copper substrate and a copper oxide nanosheet array. The copper oxide nanosheet array is disposed on one surface of the nanoporous copper substrate, and the nanoporous copper substrate is chemically bonded to the copper oxide nanosheet array.

13 Claims, 9 Drawing Sheets

(56) References Cited

FOREIGN PATENT DOCUMENTS

| CN | 106229462 A | * | 12/2016 |
| CN | 106410227 | | 2/2017 |
| CN | 106947995 | | 7/2017 |
| CN | 108597892 | | 9/2018 |
| TW | 201106524 | | 2/2011 |

OTHER PUBLICATIONS

Aburada, et al. (2011). Synthesis of nanoporous copper by dealloying of Al—Cu—Mg amorphous alloys in acidic solution: The effect of nickel. Corrosion Science(53), 1627-1632. (Year: 2011).*

Facile fabrication of CuO mesoporous nanosheet cluster array electrodes with super lithium-storage properties, Xin Chen, et al., Journal of Materials Chemistry, vol. 22, No. 27, pp. 13637-13642.

* cited by examiner

101 — the anode current collector is placed in an alkaline solution comprising an ammonia ion, and the nanoporous copper substrate floats on a surface of the alkaline solution comprising the ammonia ion. The anode current collector is a nanoporous copper substrate.

102 — the anode current collector reacts with the alkaline solution comprising the ammonia ion to form a composite material.

103 — the composite material is dried to form a nanoporous copper supported copper oxide nanosheet array composit

FIG. 2

ANODE OF LITHIUM BATTERY, METHOD FOR FABRICATING THE SAME, AND LITHIUM BATTERY USING THE SAME

CROSS-REFERENCE TO RELATED APPLICATIONS

This application claims all benefits accruing under 35 U.S.C. § 119 from China Patent Application No. 201811146948.2, filed on Sep. 29, 2018, in the China National Intellectual Property Administration, the contents of which are hereby incorporated by reference. The application is also related to copending application entitled, "NANOPOROUS COPPER SUPPORTED COPPER OXIDE NANOSHEET ARRAY COMPOSITES AND METHOD THEREOF", filed Feb. 15, 2019 (Ser. No. 16/276,919).

FIELD

The present disclosure relates to an anode of lithium battery, method for fabricating the anode, and lithium battery using the anode.

BACKGROUND

A lithium ion battery has become an ideal power source of portable electronic devices and environmentally-friendly electric vehicles due to their high mass and volumetric capacity, high output voltage, low self-discharge rate, wide operating temperature range, fast charge and discharge, and no memory effect. With the popularization of portable electronic devices and the development of electric vehicles, the lithium ion battery will occupy a broader market in the future. In order to meet the market demand for the lithium ion battery performance, the lithium ion battery with higher performance will be researched in the future.

Conventionally, an anode of the lithium ion battery generally uses copper oxide powders as an anode electrode material. The copper oxide powders are coated and adhered on an current collector by using a binder, the operation steps are numerous, and the production process is cumbersome. Since the binder itself is not electrically conductive and cannot contribute to the capacity, the electron conduction is hindered and the specific capacity decreases. Therefore, the lithium ion battery has a poor cycle performance.

BRIEF DESCRIPTION OF THE DRAWINGS

Implementations of the present technology will now be described, by way of embodiments, with reference to the attached figures.

FIG. 2 is a flowchart of one embodiment of a method for making a nanoporous copper supported copper oxide nanosheet array composite.

DETAILED DESCRIPTION

Figure 1:
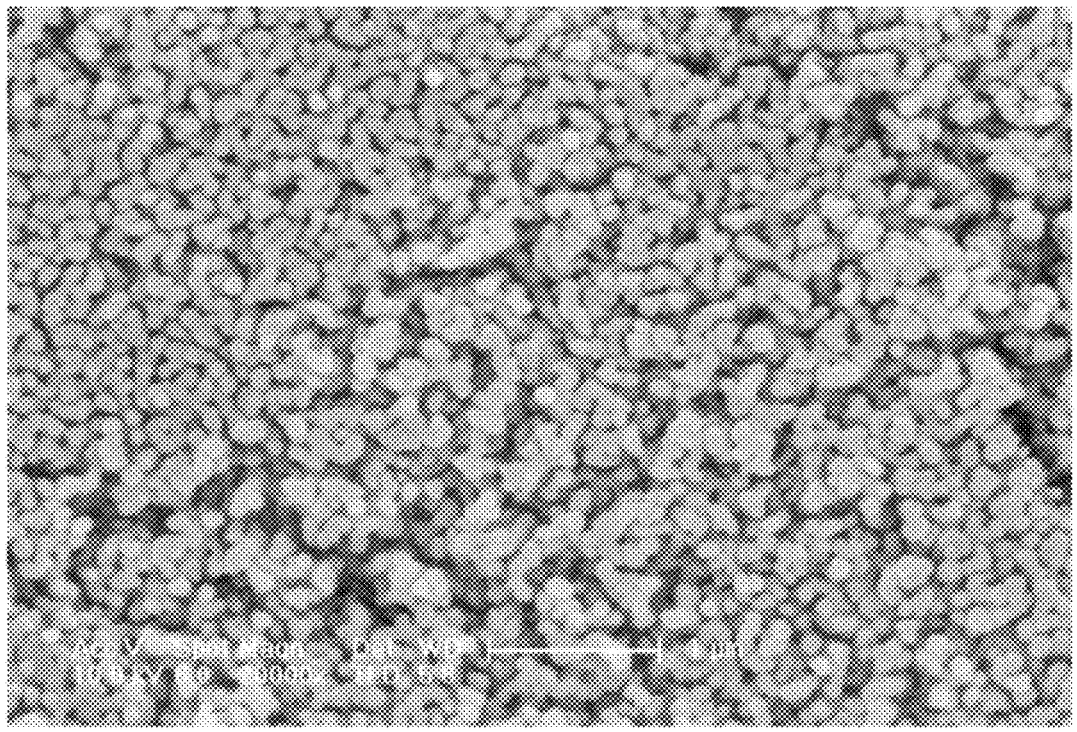
FIG. 1 is a scanning electron micrograph of a nanoporous copper substrate.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

An anode of lithium battery is provided. The anode comprises an anode current collector and a copper oxide nanosheet array. In one embodiment, the anode consists of the anode current collector and the copper oxide nanosheet array. The anode current collector is a nanoporous copper substrate. The copper oxide nanosheet array is disposed on one surface of the nanoporous copper substrate. The nanoporous copper substrate is chemically bonded to the copper oxide nanosheet array. The copper oxide nanosheet array comprises a plurality of copper oxide nanosheets. The plurality of copper oxide nanosheets are perpendicular to the nanoporous copper substrate and staggered to form an array structure.

The nanoporous copper substrate is a sheet structure. Referring to FIG. 1, the nanoporous copper substrate comprises a plurality of metal ligaments. The plurality of metal ligaments are staggered to form a plurality of pores. The plurality of pores may be regularly distributed or may be irregularly distributed. Diameters of the plurality of pores range from about 20 nm to about 200 nm. A thickness of the nanoporous copper substrate ranges from about 0.01 mm to about 1 mm. In one embodiment, the thickness of the nanoporous copper substrate ranges from about 10 µm to about 100 µm, and the diameter of each of the pores ranges from about 20 nm to about 200 nm.

In one embodiment, the nanoporous copper substrate comprises a reinforcement. The reinforcement is embedded in the porous of the nanoporous copper substrate to improve a mechanical strength of the nanoporous copper substrate. The material of the reinforcement can be, but not limited to, a carbon nanotube structure or a graphene. The carbon nanotube structure comprises at least one carbon nanotubes. When the carbon nanotube structure comprises a plurality of carbon nanotubes, the plurality of carbon nanotubes can be randomly arranged, or the plurality of carbon nanotubes form a film structure. The film structure comprises a drawn carbon nanotube film, a pressed carbon nanotube film, or a flocculated carbon nanotube film.

The plurality of carbon nanotubes in the drawn carbon nanotube film are connected to each other end to end by van der Waals force and arranged along a same direction. The plurality of carbon nanotubes in the pressed carbon nanotube film are disordered and arranged in the same direction or in different directions. The plurality of carbon nanotubes in the flocculated carbon nanotube film are attracted to each other by Van der Waals force and entangled to form a network structure comprising micropores.

A height of a copper oxide nanosheet ranges from about 200 nm to about 1.5 µm. A thickness of the copper oxide nanosheet ranges from about 20 nm to about 80 nm. The height of the copper oxide nanosheet array refers to the length of the copper oxide nanosheet perpendicular to the nanoporous copper substrate.

The anode of the lithium ion battery consists of the anode current collector and the copper oxide nanosheet array, and the anode current collector is chemically bonded to the copper oxide nanosheet array. The copper oxide nanosheet array can use as an anode material layer. That is, the anode current collector is chemically bonded to the anode layer. The anode does not comprise a binder, and the nanoporous copper substrate uses as the anode current collector. Therefore, an internal resistance of the lithium ion battery is reduced, an electron conduction is promoted, and a conductivity of the lithium ion battery is improved. Moreover, an electron conduction path can be effectively shortened. The above factors are beneficial to an improvement of an cycle performance of the lithium ion battery.

A flowchart is presented in accordance with an embodiment as illustrated. The embodiment of a method 1 for making an anode of lithium battery is provided, as there are a variety of ways to carry out the method. The method 1 described below can be carried out using the configurations illustrated in FIG. 2. Each block represents one or more processes, methods, or subroutines carried out in the method 1. Additionally, the illustrated order of blocks is by example only, and the order of the blocks can be changed. Method 1 can begin at block 101. Depending on the embodiment, additional steps can be added, others removed, and the ordering of the steps can be changed.

At block 101, the anode current collector is placed in an alkaline solution comprising an ammonium ion, and the nanoporous copper substrate floats on a surface of the alkaline solution comprising the ammonium ion. The anode current collector is a nanoporous copper substrate.

At block 102, the anode current collector reacts with the alkaline solution comprising the ammonium ion to form a composite material.

At block 103, the composite material is dried to form a nanoporous copper supported copper oxide nanosheet array composite.

At block 101, the nanoporous copper substrate can be obtained by a conventional method, such as a dealloying method. The nanoporous copper substrate can be formed by dealloying an alloy substrate. The alloy substrate is a copper alloy substrate, such as, a copper-zinc alloy or a copper-aluminum alloy. The dealloying method can be a method of free etching or electrochemical dealloying. A thickness of the nanoporous copper substrate is related to a thickness of the alloy substrate. The nanoporous copper substrate is a sheet structure. The thickness of the nanoporous copper substrate ranges from about 0.01 mm to about 1 mm. The nanoporous copper substrate has a plurality of pores. A diameter of each of the pores ranges from about 20 nm to about 200 nm. In one embodiment, the thickness of the nanoporous copper substrate is about 0.05 mm, and the diameter of each pore ranges from about 20 nm to about 200 nm.

The nanoporous copper substrate can be tailored to a size and shape as required. The nanoporous copper substrate is gently placed on the surface of the alkaline solution comprising the ammonium ion to avoid damaging the nanoporous copper substrate and affecting a morphology of a subsequently formed copper oxide nanosheet array. Since the nanoporous copper substrate has a small density and a high specific surface area, the nanoporous copper substrate can freely float on the surface of an alkaline solution comprising the ammonium ion. The alkaline solution comprising the ammonium ion is an ammonia solution or a sodium hydroxide solution. A concentration of the alkaline solution comprising the ammonium ion ranges from about 0.016 mol/L to about 1 mol/L. In one embodiment, the concentration of the alkaline solution comprising the ammonium ion ranges from about 0.016 mol/L to about 0.033 mol/L. Further, a step of removing impurities from the nanoporous copper substrate can be comprised before block 101, so that a finally formed nanoporous copper supported copper oxide nanosheet array composite has a good morphology. In one embodiment, the nanoporous copper substrate can be performed by a cleaning and drying treatment. Firstly, the nanoporous copper substrate can be washed with hydrochloric acid to remove the oxide layer on the surface of the nanoporous copper substrate. Secondly, the nanoporous copper substrate is cleaned and degreased by pure water or alcohol. A cleaned nanoporous copper substrate is placed in a vacuum drying oven and dried for 2 hours to 6 hours at a temperature in a range from about 140° to about 200°. In one embodiment, the cleaned nanoporous copper substrate is placed in the vacuum drying oven and dried at a temperature of 80° for 2 hours.

In one embodiment, the nanoporous copper substrate comprises a reinforcement. The reinforcement is embedded in the porous of the nanoporous copper substrate to improve a mechanical strength of the nanoporous copper substrate. The material of the reinforcement can be, but not limited to, a carbon nanotube structure or a graphene. The carbon nanotube structure comprises at least one carbon nanotubes. When the carbon nanotube structure comprises a plurality of carbon nanotubes, the plurality of carbon nanotubes can be randomly arranged, or the plurality of carbon nanotubes forms a film structure. The film structure comprises a drawn carbon nanotube film, a pressed carbon nanotube film, or a flocculated carbon nanotube film.

The plurality of carbon nanotubes in the drawn carbon nanotube film are connected end to end by van der Waals force and arranged along a same direction. The plurality of carbon nanotubes in the pressed carbon nanotube film are disordered and arranged in the same direction or in different directions. The plurality of carbon nanotubes in the flocculated carbon nanotube film are attracted to each other by Van der Waals force and entangled to form a network structure with micropores.

The method of forming the nanoporous copper supported copper oxide nanosheet array composite does not affect a structure of the reinforcement. When the nanoporous copper substrate comprises the reinforcement, the nanoporous copper supported copper oxide nanosheet array composite eventually formed also has the reinforcement, and the structure of the reinforcement is unchanged.

Figure 3:
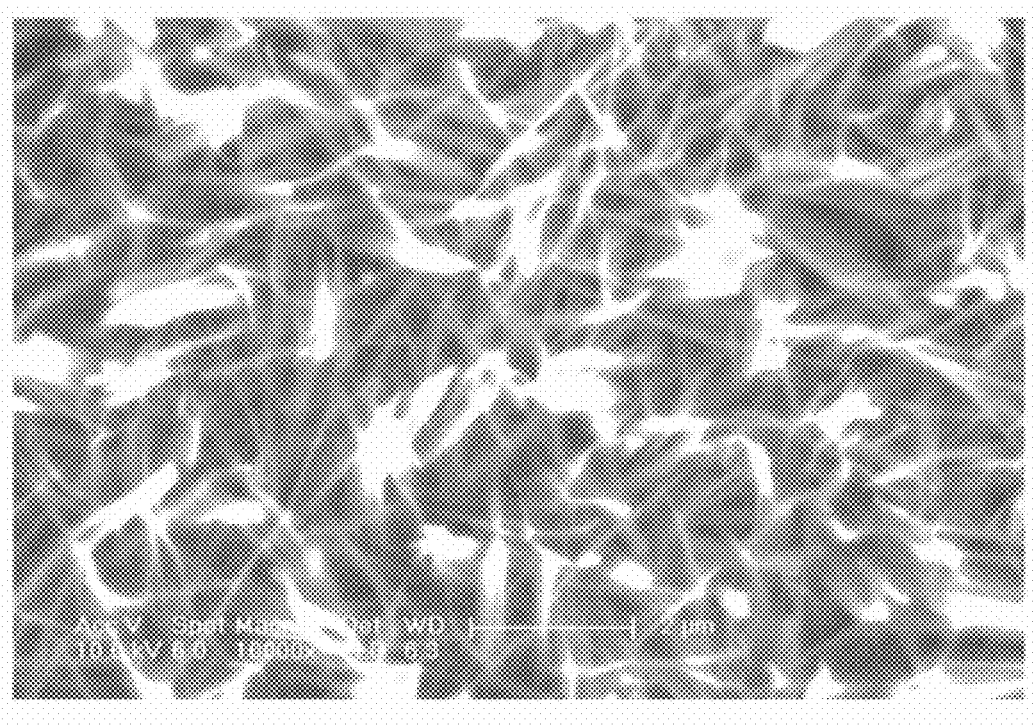
FIG. 3 is a scanning electron micrograph of a copper hydroxide formed by oxidation of the nanoporous copper substrate.

Referring to FIG. 3, at block 102, the nanoporous copper reacts with the alkaline solution comprising the ammonium ion to form the composite material, and the nanoporous copper is oxidized to form a copper hydroxide array. That is, a nanoporous copper supported copper hydroxide array composite is formed. Specifically, under an action of oxygen, water molecules, ammonium ions, and hydroxides, a surface of the nanoporous copper substrate in contact with the alkaline solution comprising the ammonium ion is rapidly oxidized, and a surface of the nanoporous copper substrate exposed to air is not oxidized. The oxidation process occurs on one side of the nanoporous copper substrate. An oxidation time of the nanoporous copper substrate ranges from about 1 hour to about 72 hours. In one embodiment, the oxidation time of nanoporous copper substrate ranges from about 1 hour to about 12 hours. The oxidation time of the nanoporous copper substrate can be shortened to 1 hour. In another embodiment, the oxidation time of the nanoporous copper substrate is 12 hours.

A rapid formation of the copper hydroxide array by oxidizing the nanoporous copper substrate mainly depends on a coordination of the ammonium ion, an activity of atoms at the metal ligament of the nanoporous copper substrate, and a rapid oxygen transmission at the surface of the alkaline solution. A principle of rapid oxidation reaction of the nanoporous copper substrate is as follows: the metal ligament of the nanoporous copper substrate has a small size, and copper atoms at the metal ligament are chemically highly active, so that the copper atoms are dissolved. The dissolved copper atoms are located in a contact surface between the nanoporous copper substrate and the alkaline solution comprising the ammonium ion, and the contact surface has a high oxygen concentration, thereby facilitating oxygen transmission. Therefore, the dissolved copper atoms are oxidized by oxygen in the alkaline solution to form divalent copper ions. Under an action of a strong ligand ($NH_3$), the divalent copper ions tend to form a four-coordination ligand $[Cu(H_2O)_2(NH_3)]^{2+}$ with a planar quadrilateral configuration. A formed copper ligand continuously aggregates and grows at the metal ligament location, a $Cu(OH)_2$ crystal with good thermodynamic stability is formed. A nucleation and growth of $Cu(OH)_2$ crystal is supported by the metal ligament, and the $Cu(OH)_2$ crystal growth mode is an unidirectional growth. The $Cu(OH)_2$ crystal grows along a gravity direction by a gravity pull, and a one-dimensional acicular nano copper hydroxide array is formed.

Figure 4:
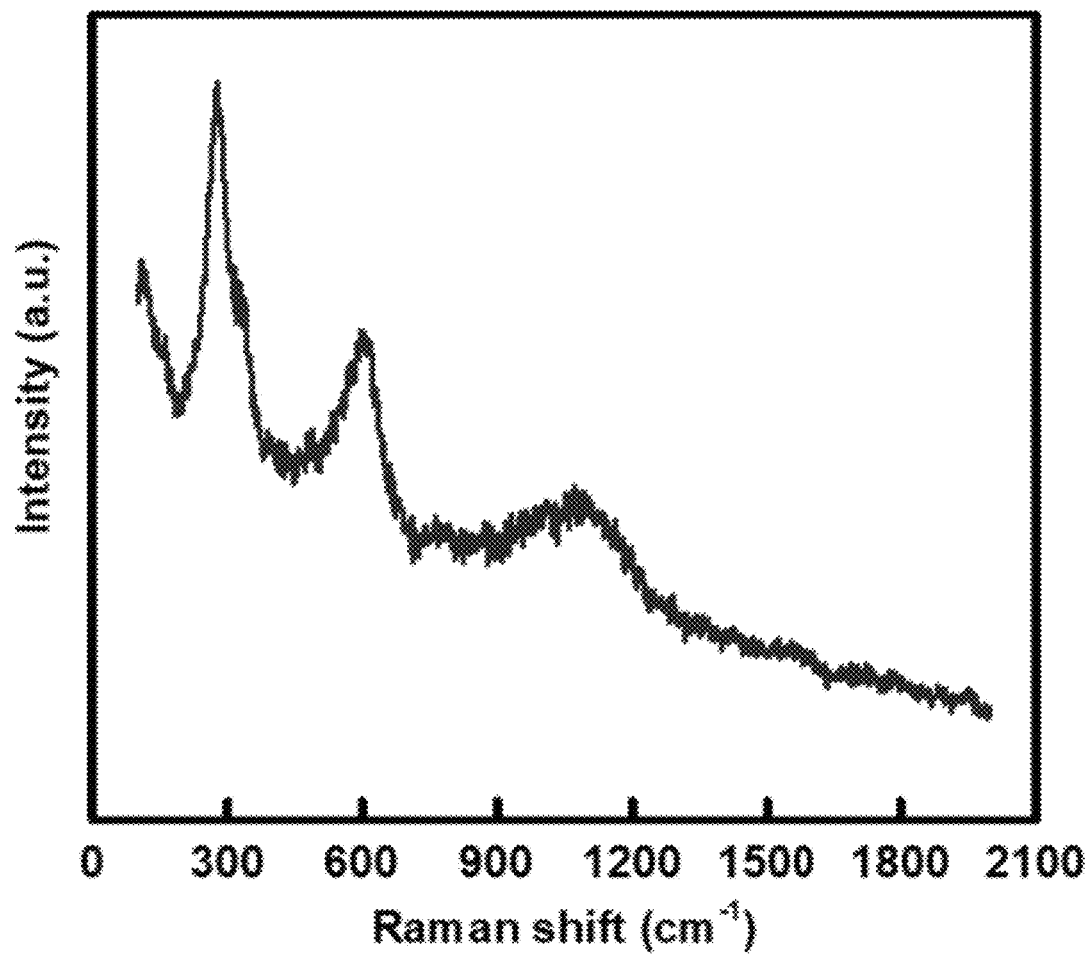
FIG. 4 is a Raman spectroscopy of a copper oxide.
Figure 5:
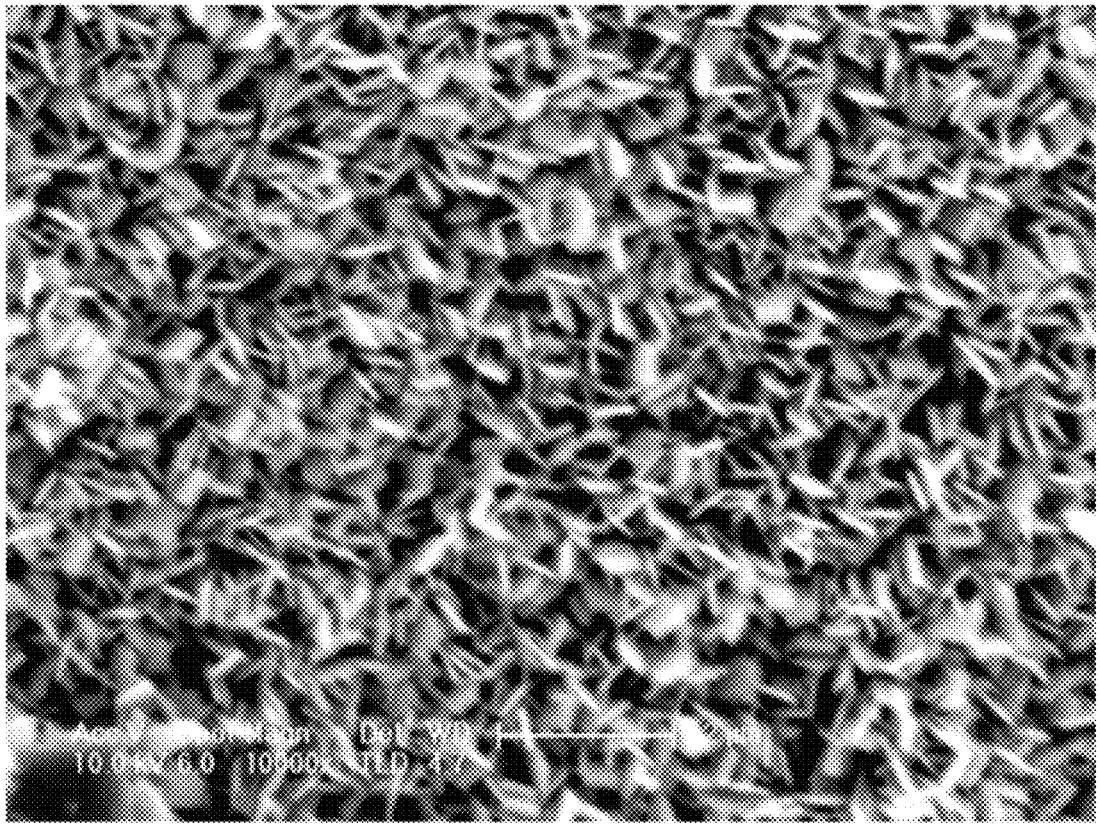
FIG. 5 is a scanning electron micrograph of a copper oxide nanosheet array oxidized a composite material is about 6 hours in a 0.016 M concentration of an ammonia solution concentration.
Figure 6:
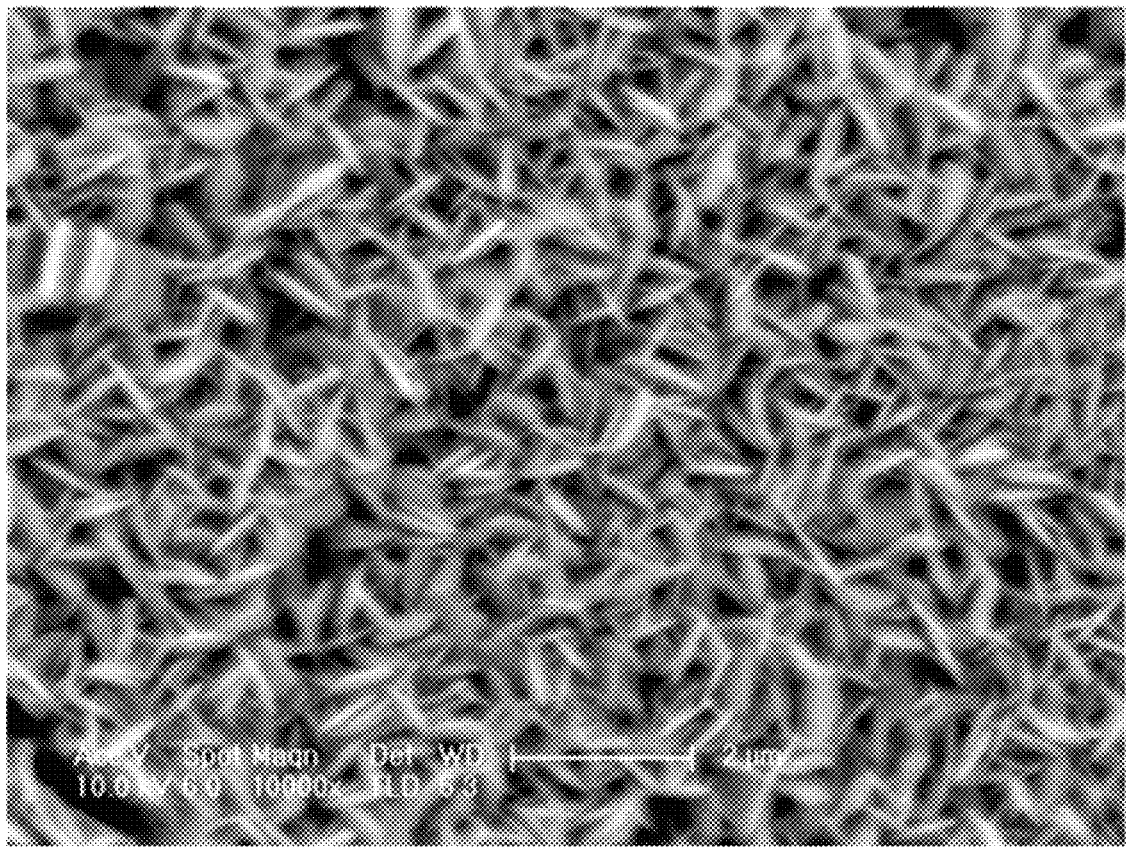
FIG. 6 is a scanning electron micrograph of a copper oxide nanosheet array oxidized the composite material is about 12 hours in a 0.033 M concentration of the ammonia solution concentration.
Figure 7:
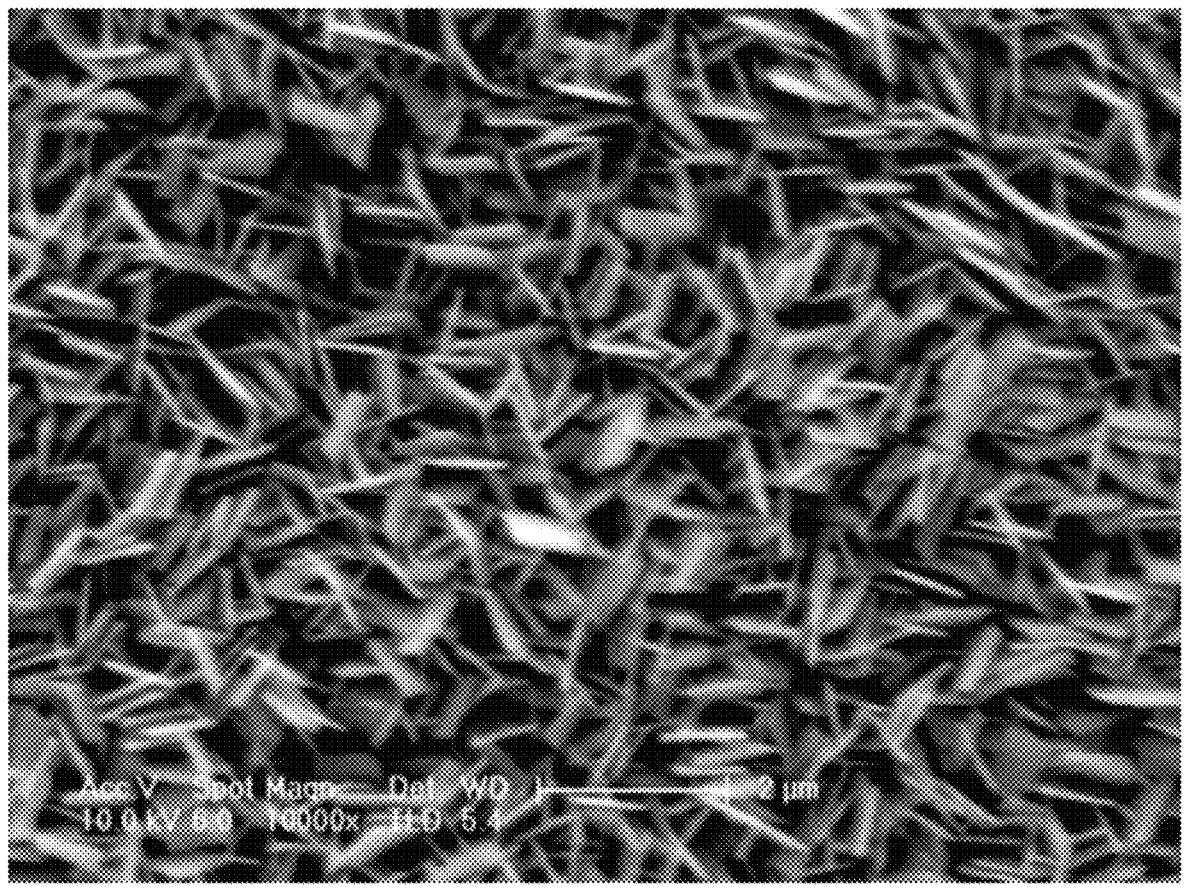
FIG. 7 is a scanning electron micrograph of a copper oxide nanosheet array oxidized the composite material is about 6 hours in a 0.016 M concentration of the ammonia solution concentration.
Figure 8:
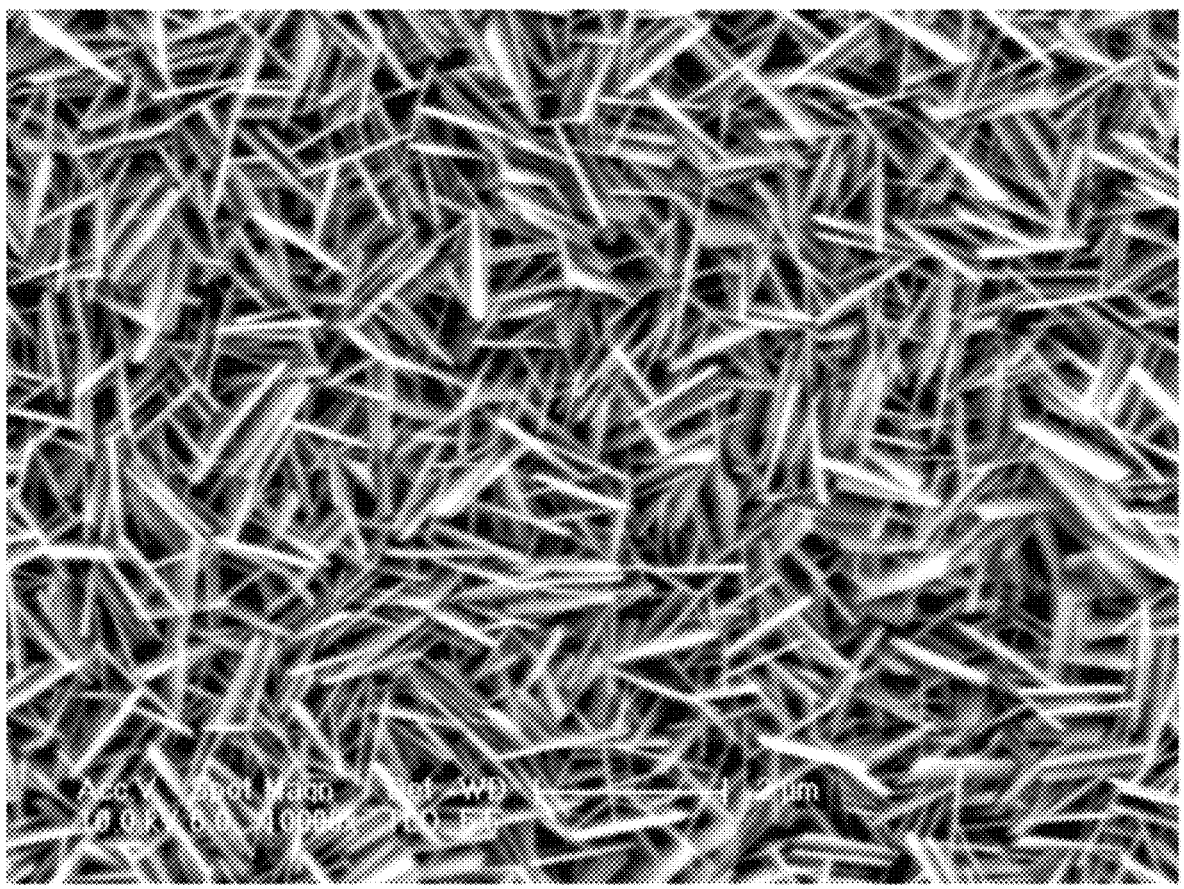
FIG. 8 is a scanning electron micrograph of a copper oxide nanosheet array oxidized the composite material is about 12 hours in a 0.033 M concentration of the ammonia solution concentration.

At block 103, the composite material is dried and dehydrated in the vacuum drying oven. The copper hydroxide array in the composite material is converted into a copper oxide array to form the nanoporous copper supported copper oxide nanosheet array composite. The Raman spectrum of FIG. 4 indicates that the copper oxide array is formed after drying and dehydrating the composite material, that is, the copper hydroxide in the composite material is converted into the copper oxide. The copper hydroxide undergoes a dehydration reaction during a drying process, during which a significant atomic diffusion occurs. Adjacent acicular copper hydroxide undergoes polymerization under a surface energy action, and finally forms a two-dimensional copper oxide nanosheet array. The height of the copper oxide nanosheet ranges from about 200 nm to about 1.5 μm, and the thickness of the copper oxide nanosheet ranges from about 20 nm to about 80 nm.

A drying temperature and a drying time period of the composite material are set in stages in order to form the copper oxide nanosheet array having better crystallinity. In one embodiment, firstly, the composite material is dried at a lower temperature to remove part of water under mild conditions. Then, the temperature is increased to achieve a polymerization growth of the copper oxide to form the copper oxide nanosheet array with better crystallinity. In one embodiment, the composite material is finally dried and dehydrated at the temperature about 150° C. or more. In another embodiment, the composite material is finally dried and dehydrated at the temperature about 180° C.

FIGS. 5-8 show a scanning electron micrographs of the copper oxide nanosheet under different oxidation conditions. In the FIG. 5, a concentration of the ammonia solution concentration is about 0.016 mol/L, and an oxidation time of the composite material is about 6 hours. In the FIG. 6, the concentration of the ammonia solution is about 0.016 mol/L, and the oxidation time of the composite material is about 12 hours. In the FIG. 7, the concentration of the ammonia solution is about 0.033 mol/L, and the oxidation time of the composite material is about 6 hours. In the FIG. 8, the concentration of the ammonia solution is about 0.033 mol/L, and the oxidation time of the composite material is about 12 hours. As shown in the FIGS. 5-8, when the oxidation time of the composite material is the same, the larger the ammonia solution concentration is, and the larger the size of the copper oxide nanosheet is. When the ammonia solution concentration is the same, the longer the oxidation time is, and the larger the size of the copper oxide nanosheet is.

In order to form the copper oxide nanosheet array having a good morphology, the composite material can be cleaned and dried to remove impurities before drying the composite material at block 103. In one embodiment, the composite material is placed in pure water or alcohol to clean the composite material, and then vacuum dried.

The morphology of the copper oxide nanosheet array is related to a concentration and type of the alkaline solution, the oxidation time, a drying temperature time. Therefore, the concentration and type of the alkaline solution, the oxidation time, the drying temperature and the drying time can be adjusted to achieve a required morphology of the copper oxide nanosheet array.

A lithium battery is provided in one embodiment. A lithium ion battery comprises a cathode electrode, an anode electrode, a separator, and an electrolyte solution. The cathode electrode and the anode electrode are spaced from each other by the separator. The cathode electrode comprises a cathode current collector and a cathode material layer, and the cathode material layer is disposed on a surface of the cathode current collector. The anode comprises an anode current collector and a copper oxide nanosheet array. In one embodiment, the anode consists of the anode current collector and the copper oxide nanosheet array. The anode current collector is a nanoporous copper substrate. The copper oxide nanosheet array is disposed on one surface of the nanoporous copper substrate. The nanoporous copper substrate is chemically bonded to the copper oxide nanosheet array. The copper oxide nanosheet array comprises a plurality of copper oxide nanosheets. The plurality of copper oxide nanosheets are perpendicular to the nanoporous copper substrate and staggered to form an array structure. The copper oxide nanosheet array is used as an anode material layer. The anode material layer and the cathode material layer are spaced from each other by the separator.

The copper oxide nanosheet array is used as an anode material layer, and the nanoporous copper substrate is chemically bonded to the copper oxide nanosheet array. That is, the anode current collector is chemically bonded to the anode layer. The anode does not comprise a binder, and the nanoporous copper substrate uses as the anode current collector. Therefore, an internal resistance of the lithium ion battery is reduced, an electron conduction is promoted, and a conductivity of the lithium ion battery is improved. Moreover, an electron conduction path can be effectively shortened. The above factors are beneficial to an improvement of a cycle performance of the lithium ion battery.

The cathode material layer comprises a cathode active material. Further, the cathode material layer can comprise a conductive agent and a binder. The cathode electrode active material can be selected from a layer type lithium transition metal oxide having a structure, a spinel type lithium transition metal oxide, and an olivine type lithium transition metal oxide, for example, olivine type lithium iron phosphate, layer type lithium cobaltate, layer type lithium manganate, spinel type lithium manganate, lithium nickel manganese oxide and lithium nickel cobalt manganese oxide of combination of them.

The binder in the cathode material layer can be selected from polyvinylidene fluoride (PVDF), polytetrafluoroethylene (PTFE), fluorine rubber, EPDM rubber, and styrene-butadiene rubber (SBR) of combination of them.

The conductive agent in the cathode material layer can be selected from graphene, carbon nanotubes, carbon fibers, conductive carbon black, porous carbon, cracked carbon, acetylene black, activated carbon, conductive graphite, and amorphous carbon of combination of them.

The separator can be selected from a polyolefin porous film, a modified polypropylene felt, a polyethylene felt, a glass fiber felt, or a composite film. The composite film is formed by welding or bonding an ultrafine glass fiber paper vinyl on felt or a nylon felt and a wettable polyolefin microporous film.

The electrolyte solution comprises a lithium salt and a nonaqueous solvent. The lithium salt can be one or more of lithium chloride (LiCl), lithium hexafluorophosphate ($LiPF_6$), lithium tetrafluoroborate ($LiBF_4$), lithium methanesulfonate ($LiCH_3SO_3$), lithium trifluoromethanesulfonate ($LiCF_3SO_3$), lithium hexafluoroarsenate ($LiAsF_6$), lithium hexafluoroantimonate ($LiSbF_6$), lithium perchlorate ($LiClO_4$), $Li[BF_2(C_2O_4)]$, $Li[PF_2(C_2O_4)_2]$, $Li[N(CF_3SO_2)_2]$, $Li[C(CF_3SO_2)_3]$ and lithium bis(oxalate) borate (LiBOB).

The nonaqueous solvent can selected from a cyclic carbonate, a chain carbonate, a cyclic ether, a chain ether, a nitrile, and an amide of combination of them, such as, ethylene carbonate (EC), diethyl carbonate (DEC), propylene carbonate (PC), dimethyl carbonate (DMC), ethyl methyl carbonate (EMC), butylene carbonate, γ-butyrolactone, γ-valerolactone, dipropyl carbonate, N-methylpyrrolidone (NMP), N-methylformamide, N-methylacetamide, dimethylformamide, diethylformamide, diethyl ether, acetonitrile, propionitrile, anisole, succinonitrile, adiponitrile, glutaronitrile, dimethyl sulfoxide, dimethyl sulfite, vinylene carbonate, ethyl methyl carbonate, dimethyl carbonate, diethyl carbonate, fluoroethylene carbonate, anhydride, sulfolane, methoxymethyl sulfone, tetrahydrofuran, 2-methyltetrahydrofuran, propylene oxide, methyl acetate, ethyl acetate, propyl acetate, methyl butyrate, ethyl propionate, ethyl propionate, methyl propionate, dimethylformamide, 1,3-dioxolane, 1,2-diethoxyethane, 1,2-dimethoxyethane, 1,2-dibutoxy of combination of them.

Embodiment 1

In Embodiment 1, a nanoporous copper substrate having a size of 1 cm by 1 cm is provided. Firstly, the nanoporous copper substrate is cleaned with hydrochloric acid to remove an oxide layer on surfaces of the nanoporous copper substrate. Secondly, the nanoporous copper substrate is degreased by pure water or alcohol. Finally, the nanoporous copper substrate is dried in a vacuum drying oven at a temperature of 80° C. for 2 hours. Then, the nanoporous copper substrate is oxidized as follows: the nanoporous copper substrate is gently placed on a surface of a 0.033 mol/L ammonia solution in a natural floating state at a room temperature for 12 hours, and the nanoporous copper is oxidized to form a composite material (copper hydroxide array). The composite material is taken out from the ammonia solution, washed in pure water and alcohol respectively, and vacuum dried. Then, the dried composite material is placed in the vacuum drying oven. Firstly, the vacuum drying oven is set at a temperature 60° C. for 2 hours; then the vacuum drying oven is set at a temperature 120° C. for 2 hours; finally the vacuum drying oven is set at a temperature 180° C. for 2 hours, and naturally cooled to room temperature to obtain the nanoporous copper supported copper oxide nanosheet array composite. The copper oxide nanosheet array is formed on one surface of the nanoporous copper substrate. An average length of the copper oxide nanosheet under this condition is about 1.2 μm, and an average thickness of the copper oxide nanosheets is about 40 nm.

An anode, a cathode, a separator and an electrolyte solution are assembled into a button battery. The nanoporous copper copper oxide nanosheet array composite is directly used as the anode of the lithium ion battery. The cathode is a pure metal lithium plate, the separator is a polymer material polyolefin porous film, and the electrolyte solution is made of ethylene carbonate (EC) and dimethyl carbonate (DMC). The volume ratio of ethylene carbonate (EC) and dimethyl carbonate (DMC) is 1:1.

Figure 9:
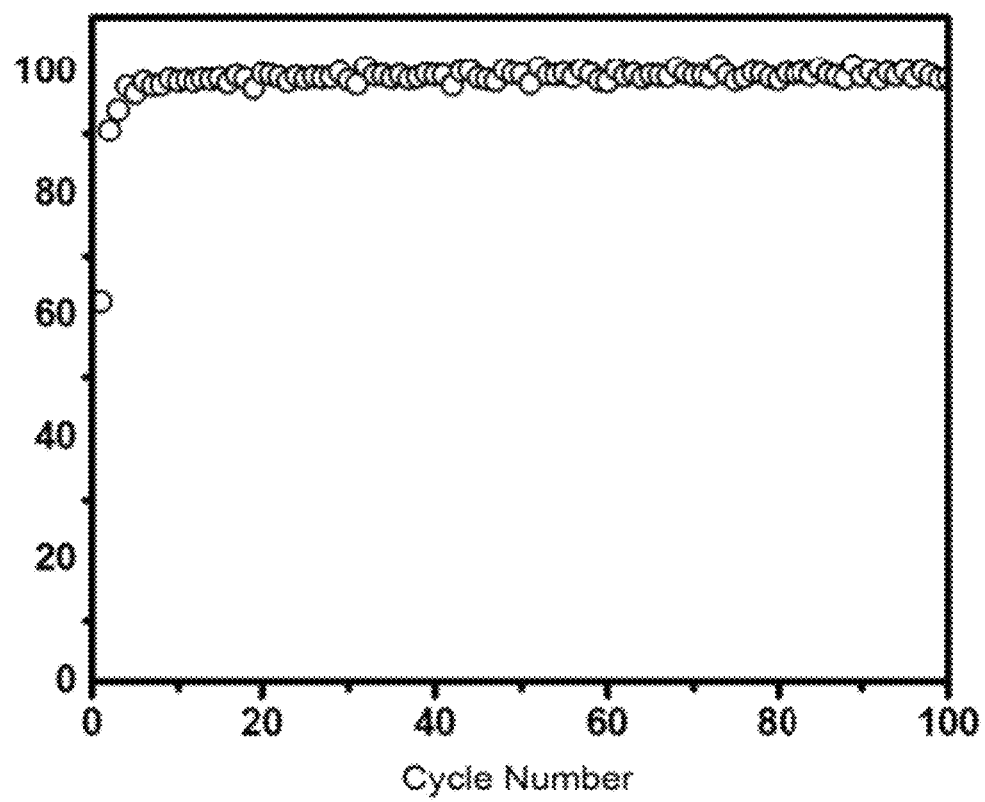
FIG. 9 is a cycle test diagram of an anode of the lithium ion battery.

The assembled button battery undergoes a charge and discharge cycle performance test at 0.1 mA $cm^{-2}$ constant current. A test voltage is greater than 0 V and less than or equal to 3 V. As shown in FIG. 9, when cycle times of the button battery is 100 times, a coulombic efficiency of the anode remains above 95%. It can be seen that the lithium ion battery of the Example 11 has a good cycle performance.

The method for making an anode of a lithium battery has the following characteristics. First, a plurality of nanoporous copper substrates prepared by different methods can be used to form the copper oxide nanosheet array by an oxidation treatment. The nanoporous copper substrate is easy to obtain. Second, the method is convenient and efficient and without complicated and expensive equipment. The method can be carried out at room temperature. The nanoporous copper is rapidly oxidized to form the copper oxide nanosheet array, and the morphology of the copper oxide nanosheet is conveniently adjustable. Third, the copper oxide nanosheet array is formed on one surface of the nanoporous copper. The nanoporous copper supported copper oxide nanosheet array not only has the performance of the copper oxide nanosheet array, but also retains structural characteristics and properties of the nanoporous copper. Therefore, the nanoporous copper supported copper oxide nanosheet array realizes the structural and functional integration of the two materials after compounding, and further fully synergizes the two materials.

The method for making the anode and the lithium battery have the following characteristics. First, the copper oxide nanosheet array can be used as an active lithium storage layer. The nanoporous copper as an anode current collector not only has excellent electrical conductivity, but also can alleviate a volume change of a copper oxide during charging and discharging. Therefore, a cycle performance of the lithium ion battery can be improved. Further, the copper oxide nanosheet array comprises a plurality of the copper oxide nanosheets, and has a high specific surface area. The high specific surface area can increase a contact area between the electrolyte and the copper oxide, and effectively improve the conductivity of copper oxide. The high specific surface area can also shorten an electron conduction distance and increase the electron conduction speed to improve the cycle performance of the lithium ion battery. Second, the copper oxide nanosheet array is chemically bonded to the nanoporous copper substrate. There is a strong binding force between the copper oxide nanosheet array and the nanoporous copper substrate. Therefore, the copper oxide nanosheet array is not easily peeled off from the nanoporous copper substrate. Third, there is no binder in the anode, the anode consists of the anode current collector and the copper oxide nanosheet array, and the nanoporous copper substrate uses as the anode current collector. Therefore, an internal resistance of the lithium ion battery is reduced, an electron conduction is promoted, and a conductivity of the lithium ion battery is improved. Moreover, an electron conduction path can be effectively shortened. The above factors are beneficial to an improvement of a cycle performance of the lithium ion battery. Fourth, when the nanoporous copper substrate comprises the reinforcement, a mechanical strength of the nanoporous copper substrate can be improved.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for making an anode of the lithium ion battery, comprising:
   dealloying a copper alloy substrate to form a nanoporous copper substrate, wherein the nanoporous copper substrate consists of a nanoporous copper;
   placing the nanoporous copper substrate in an alkaline solution comprising an ammonium ion thereby the nanoporous copper substrate floats on a surface of the alkaline solution comprising the ammonium ion;
   setting up conditions wherein the nanoporous copper substrate react with the alkaline solution comprising the ammonium ion to form a composite material; and
   drying the composite material to form a nanoporous copper supported copper oxide nanosheet array composite, wherein the copper oxide nanosheet array comprises a plurality of copper oxide nanosheets, and the plurality of copper oxide nanosheets are perpendicularly with the nanoporous copper substrate.

2. The method as claimed in claim 1, wherein the alkaline solution comprising the ammonium ion is an ammonium solution or a sodium hydroxide solution.

3. The method as claimed in claim 1, wherein a concentration of the alkaline solution comprising the ammonium ion is ranged from about 0.016 mol/L to about 1 mol/L.

4. The method as claimed claim 1, the method of setting up conditions comprising contacting a surface of the nanoporous copper substrate with the alkaline solution comprising the ammonium ion.

5. The method as claimed claim 1, the method of setting up conditions comprising allowing the nanoporous copper substrate to oxidize for 1 hour to 72 hours.

6. The method as claimed claim 1, the method of drying the composite material comprising setting a drying temperature and a drying time period of the composite material.

7. The method as claimed claim 1, further comprising washing the nanoporous copper substrate is washed to remove an oxide layer on a surface of the nanoporous copper substrate before placing the nanoporous copper substrate in the alkaline solution.

8. The method as claimed claim 1, wherein the nanoporous copper is oxidized to form a copper hydroxide array during the process of the nanoporous copper substrate reacting with the alkaline solution.

9. The method as claimed claim 8, wherein a surface of the nanoporous copper substrate in contact with the alkaline solution comprising the ammonium ion is oxidized, and a surface of the nanoporous copper substrate exposed to air is not oxidized.

10. The method as claimed claim 1, wherein the nanoporous copper substrate comprises a reinforcement, and the reinforcement is a carbon nanotube structure or a graphene.

11. The method as claimed claim 1, wherein a material of the copper alloy substrate is a copper-zinc alloy or a copper-aluminum alloy.

12. The method as claimed claim 1, wherein a thickness of the nanoporous copper substrate ranges from about 0.01 mm to about 1 mm.

13. The method as claimed claim 1, wherein the nanoporous copper substrate has a plurality of pores, and a diameter of each of the pores ranges from about 20 nm to about 200 nm.

* * * * *